Patented July 9, 1946

2,403,771

UNITED STATES PATENT OFFICE 2,403,771

ORGANIC PEROXIDES

William E. Vaughan and Frederick F. Rust, Berkeley, Calif., assignors to Shell Development Company, San Francisco, Calif., a corporation of Delaware No Drawing. Application November 15, 1943, Serial No. 510,420

5 Claims. (Cl. 260—610)

This invention relates to a novel class of organic peroxides, and more particularly pertains to organic peroxides in which the two oxygen atoms of the peroxy (—O—O—) radical are each attached to organic radicals by tertiary carbon atoms of aliphatic character, i. e. carbon atoms each of which is directly attached to three other carbon atoms. In one of its more specific embodiments the present invention is directed to novel and useful di(tertiary alkyl) peroxides, particularly symmetrical saturated di(tertiary alkyl) peroxides.

A method of producing this novel class of organic peroxides is described and claimed in the co-pending application Serial No. 474,224, filed January 30, 1943, the present application being a continuation-in-part of said parent case. It is stated therein that the novel class of peroxides may be formed by subjecting certain organic compounds, and particularly the substituted or unsubstituted hydrocarbons containing at least one tertiary carbon atom of aliphatic character, to a controlled non-explosive oxidation in the presence of hydrogen bromide, or of a compound capable of yielding this hydrogen halide under the operating conditions. More specifically stated, the novel organic peroxides of the present invention, e. g. the di(tertiary alkyl) peroxides, may be produced by subjecting the hereinbelow more fully described class of organic compounds containing a tertiary carbon atom of aliphatic character to the action of oxygen or of an oxygen-containing or oxygen-yielding material in the presence of hydrogen bromide, or a substance capable of yielding this hydrogen bromide under the operating conditions, this reaction being effected at temperatures and pressures below those capable of causing spontaneous combustion and therefore the resultant decomposition of the carbon structure of the starting organic material.

The starting organic compounds which may be thus oxidized to produce the novel organic peroxides contain a tertiary carbon atom of aliphatic character, and may therefore be generally represented by the formula

wherein each R represents a like or different alkyl, aryl, aralkyl, alkaryl, alicyclic or heterocyclic radical, two of which together may form an alicyclic ring compound, which radicals may be further substituted for instance by the presence of one or more halogen, nitrogen and/or oxygen atoms which may be attached to one or more of the carbon atoms of such radicals. A sub-class of organic compounds which may be used as the starting materials to produce a preferred group of novel organic peroxides comprises the saturated aliphatic hydrocarbons containing at least one tertiary carbon atom, as well as their halo-substituted derivatives in which the halogen atom or atoms are attached to any one or several carbon atoms of the various alkyl radicals attached to the tertiary carbon atom, which latter carries a replaceable hydrogen atom. The following is a non-limiting representative list of saturated aliphatic hydrocarbons (containing at least one tertiary carbon atom) which may be oxidized to produce the novel organic peroxides: isobutane, 2-methyl butane, 2-ethyl butane, 2-methyl pentane, 3-methyl pentane, 2,3-dimethyl butane, 2,4-dimethyl butane, and their homologues, as well as their halogenated derivatives in which the halogen atom or atoms are attached to the primary or secondary carbon atoms so that the tertiary carbon atom or atoms contain a replaceable hydrogen atom. The following are examples of such halogenated derivatives: 1-halo-2-methyl propane, 1-halo-2-ethyl propane, 1-halo-2-methyl butane, 1-halo-3-methyl butane, 2-halo-3-methyl butane, and the like, and their homologues. Also, one or more of the aliphatic radicals attached to the tertiary carbon atom may be substituted by an aryl, aralkyl or alkaryl radical. As examples of such compounds reference may be made to isopropyl benzene, 1-phenyl-1-methyl propane, 1-phenyl-2-methyl propane, and the like.

When the novel organic peroxides of the present invention are formed by the slow (i. e. non-explosive) controlled oxidation of the above-outlined class of organic compounds, this oxidation must be effected at temperatures below those at which spontaneous combustion or substantial decomposition of the carbon structure occurs. This upper temperature limit will at least in part depend on the specific organic substance treated, as well as on the proportions thereof and of the oxygen and hydrogen bromide present in the vaporous mixture treated. Generally, this upper temperature limit is in the neighborhood of about 200° C. However, with shorter contact periods and/or when inert diluents are employed, this temperature may be raised above the mentioned limit, e. g. to about 250° C. and higher, particularly when some of the more stable organic compounds of the defined class are oxidized to produce the novel peroxides. Some of the more readily oxidizable compounds require lower temperatures, e. g. about 150° C. and lower. With a further decrease in the operating temperature the output of the desired peroxides will decrease so that at temperatures of below about 100° C. the controlled oxidation in the presence of the hydrogen halides may become uneconomical.

In order to produce the novel class of organic peroxides by the above outlined oxidation of the starting organic compounds containing a tertiary carbon atom of aliphatic character, it is possible to employ the starting organic material and the oxygen in widely varying volumetric ratios, although satisfactory yields of the desired novel organic peroxides may be obtained by employing equivolumetric quantities thereof. As to the amount of the hydrogen bromide to be employed as the catalyst, it is preferred to employ this catalyst in an amount above about 20% by volume of the total mixture subjected to treatment. Although lower concentrations of the hydrogen bromide may be employed, this tends to decrease the percentage of oxygen which will react to form the oxygenated products. Also, it has been found that lower concentrations of the hydrogen bromide tend to decrease the yield of the desired novel organic peroxides in favor of the production of other oxygenated products.

The control of catalytic oxidation of the defined class of organic materials to produce the organic peroxides of the present invention may be effected at any pressure. The reaction may be realized in liquid or vapor phase, or in a two-phase liquid-vapor system, and in the presence or absence of inert diluents, such as steam, nitrogen, carbon dioxide, etc. Since relatively high oxygen concentrations are preferred during the oxidation reaction, and since it is difficult to maintain a desirable relatively high oxygen concentration when the reaction is conducted in the liquid phase, it is generally preferable to effect the oxidation in the vapor phase. Also, although shorter or longer contact times may be employed during such oxidation reaction, highly satisfactory yields of the novel organic peroxides have been obtained with contact periods of between about 1 minute and about 3 minutes.

Instead of employing individual members of the above mentioned class of organic compounds containing at least one tertiary carbon atom of aliphatic character, the novel class of organic peroxides may be produced in accordance with the above outlined process by subjecting mixtures of compounds of this class, as well as mixtures containing one or more of these organic compounds and other organic substances, to the action of oxygen in the presence of the hydrogen halide. Also, instead of pure oxygen it is possible to use oxygen-containing mixtures, e. g. air, or even substances capable of yielding molecular oxygen under the operating conditions.

Still another method of producing the novel class of organic peroxides comprises reacting a tertiary organic hydroperoxide with a substituted or unsubstituted tertiary alcohol in the presence of an acid or acid-acting material. More specifically stated, in accordance with this process the novel peroxides may be prepared by reacting a tertiary organic hydroperoxide of the general formula

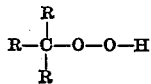

wherein each R represents a like or different organic radical, and preferably a substituted or unsubstituted aliphatic radical, with a substituted or unsubstituted tertiary alcohol, this reaction being effected in the presence of an acid or acid-acting material, preferably an aqueous solution of an inorganic acid, e. g. sulfuric acid. This method of preparation results in the formation of the above mentioned and hereinbelow more fully described class of novel organic peroxides in which both radicals are attached to the peroxy oxygen atoms via tertiary carbon atoms. By employing the corresponding tertiary hydroperoxides and tertiary alcohols, it is possible to produce symmetrical organic peroxides of the above defined class, and particularly the symmetrical di(tertiary alkyl) peroxides.

The novel organic peroxides of the present invention may be generally represented by the formula R—O—O—R, wherein each R represents an organic grouping or radical in which the carbon atom directly attached to the oxygen atom of the peroxy radical is also attached directly to three other carbon atoms. A particular subclass of these compounds has the general formula

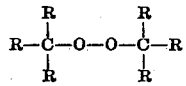

wherein each R represents a like or different alkyl radical which may or may not be further substituted, an especially useful group comprising the di(tertiary alkyl) peroxides of the above general formula, wherein each R represents a like or different saturated alkyl radical. A specific example of this subgroup of novel compounds is di(tertiary butyl) peroxide which, as stated, may be formed either by a controlled non-explosive oxidation of isobutane with oxygen in the presence of hydrogen bromide, at an elevated temperature below that at which substantial combustion of the mixture occurs, or by reacting tertiary butyl hydroperoxide with tertiary butyl alcohol at substantially ordinary or slightly elevated temperatures and in the presence of an acid or acid-acting medium. This new compound is a water-white, water-immiscible liquid having a pleasant odor and boiling at about 108° C. to 110° C. It has a specific gravity of about 0.796 at 20° C. and a refractive index $n_D^{20}$ of about 1.3893. This peroxide is unaffected when washed with 65% sulfuric acid and reacts quantitatively with concentrated hydrogen iodide solution when heated to about 60° C. for one hour in acetic acid solution to yield one mol of iodine per mol of the peroxide. When ignited, it does not explode but burns with a sooty flame. As compared to the known peroxides this novel di(tertiary butyl) peroxide is surprisingly stable: it does not explode even when dropped onto a hot plate maintained at about 250° C. Another specific example of the above subgroup of novel compounds is di(tertiary amyl) peroxide which has a refractive index of $n_D^{20}$ equal to 1.4091. This compound may also be termed di(methyl-2-butyl-2) peroxide and may be formed, for example, by the aforementioned controlled catalytic oxidation of 2-methyl butane, or by reacting tertiary amyl hydroperoxide with tertiary amyl alcohol in the presence of an acid, e. g. aqueous 65% solution of sulfuric acid. The following are additional illustrative examples of the novel di(tertiary alkyl) peroxides of the present invention: di(methyl-2-pentyl-2) peroxide, di(methyl - 3 - pentyl - 3) peroxide, di(ethyl-2- butyl-2) peroxide, and their homologues, as well as their halogenated derivatives such as di(halo-1-methyl-2-propyl-2) peroxide, di(halo-1-ethyl-2-propyl-2) peroxide, di(halo-1-methyl-2-butyl-2) peroxide, di(halo-1-methyl-3-butyl-3) peroxide, di(halo-2-methyl-3-butyl-3) peroxide. Included in the class of novel peroxides are compounds in which one or more of the aliphatic radicals attached to the tertiary carbon atoms (which are in turn directly attached to the peroxy oxygen atoms) are substituted by or contain aryl, aralkyl, alkaryl and/or alicyclic radicals, examples of such compounds being di(phenyl-1-methyl-1-propyl-1) peroxide and di(phenyl-1-methyl-2-propyl-2) peroxide.

The properties possessed by the novel tertiary peroxides adapt them admirably for use in organic reactions as well as for other purposes. For example, these novel compounds may be used as additives to improve the cetane value of Diesel engine fuels. Also, these peroxides may be employed individually or in admixture with one another or with other substances as catalysts for various chemical reactions. For instance, they may be used for the polymerization of polymerizable unsaturated compounds including both the conjugated and the unconjugated unsaturated polymerizable compounds.

The following examples are given for illustrative purposes only.

*Example I*

The reactor consisted of a coil of glass tubing having an internal diameter of 25 cm. This coil had a volume equal to 2940 cc. and was immersed in an oil bath which permitted accurate control of the reaction conditions. A preheated vaporous mixture of isobutane, oxygen and hydrogen bromide, which substances were used in a volumetric ratio of 2:2:1, was then conveyed through the reactor at substantially atmospheric pressure, at a temperature of about 158° C., and at such a rate that the residence time was equal to about 3 minutes. The reaction products were conveyed through water to separate the water-soluble compounds from the water-insoluble phase. The latter, after further washing with water, was then washed with a 2 N solution of sodium hydroxide (to destroy any and all traces of bromoketones, e. g. bromo-acetone, which may be present), and after a further water wash and a drying with sodium sulfate was subjected to distillation to separate an overhead fraction consisting of di(tertiary butyl) peroxide from the small amount of higher boiling bromides. The water-soluble phase was found to contain tertiary butyl alcohol and a minor amount of isobutyric aldehyde, as well as traces of other oxygenated compounds.

It was found that 91% of the introduced oxygen reacted to form oxygenated products. Of the total isobutane introduced, 36% appeared as di(tertiary butyl) peroxide, 28% as tertiary butyl alcohol, 12.5% as tertiary butyl hydroperoxide, 8% as unreacted isobutane, and about 2% as other oxygenated compounds such as aldehydes, acetone and brom-acetone. The remainder is largely accounted for by brominated isobutane.

*Example II*

Approximately 0.835 mol of tertiary butyl hydroperoxide in an 83% aqueous solution was slowly added over a period of about 20 minutes into a stirred mixture of one mol of tertiary butyl alcohol and one mol of an aqueous 65% solution of sulfuric acid. The reaction temperature was maintained at 30° C. The stiring was continued for about 40 minutes after the addition of the tertiary butyl hydroperoxide, and the mixture was then allowed to stand for about an hour and a half. This caused the separation of the reaction products into two liquid phases, the upper layer of which (comprising 147 cc.) was separated and added to about 70 cc. of water and 150 cc. of tertiary butyl alcohol. The mixture thus formed was then distilled to obtain an azeotropic fraction boiling at 77° C. The azeotrope was then washed with water and with 30% sulfuric acid. An 80% yield of di(tertiary butyl) peroxide was thus obtained, as calculated on the tertiary butyl hydroperoxide introduced.

*Example III*

Tertiary amyl hydroperoxide was reacted was a 100% excess of an equimolar mixture of tertiary amyl alcohol and of an aqueous 65% solution of sulfuric acid. This reaction was continued for about 2 hours while maintaining the reactants at substantially room temperature. The reaction mixture was found to separate into two liquid layers. The water-insoluble layer was separately recovered and was washed several times with water, then with a 30% aqueous sulfuric acid, and finally again with water. This material was then subjected to vacuum distillation to separate a fraction boiling at 58.5° C. at 14 mm. of mercury pressure. An analysis of this fraction showed that it was di(tertiary amyl) peroxide. Its refractive index was $n_D^{20}=1.4091$. The determination of the molecular weight by analysis of active oxygen with a 70% hydrogen iodide solution gave the theoretical value of 174 gr./mol. Further confirmation of the fact that the compound thus produced was di(tertiary amyl) peroxide was made by the carbon and hydrogen analysis presented below:

|  | Found | Theory |
| --- | --- | --- |
|  | Per cent | Per cent |
| Carbon | 60.4 | 60.0 |
| Hydrogen | 12.7 | 12.6 |

We claim as our invention:
1. Di(tertiary butyl) peroxide.
2. Di(tertiary amyl) peroxide.
3. A symmetrical, saturated di(tertiary alkyl) peroxide.
4. A symmetrical di(tertiary alkyl) peroxide.
5. A di(tertiary alkyl) peroxide.

WILLIAM E. VAUGHAN.
FREDERICK F. RUST.